US012776578B2

(12) United States Patent
Nagai et al.

(10) Patent No.: US 12,776,578 B2
(45) Date of Patent: Oct. 27, 2026

(54) RING-TYPE DEVICE

(71) Applicant: Murata Manufacturing Co., Ltd., Kyoto-fu (JP)

(72) Inventors: Takahiro Nagai, Nagaokakyo (JP); Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 150 days.

(21) Appl. No.: 18/587,266

(22) Filed: Feb. 26, 2024

(65) Prior Publication Data

US 2024/0250428 A1 Jul. 25, 2024

Related U.S. Application Data

(63) Continuation of application No. PCT/JP2022/032332, filed on Aug. 29, 2022.

(30) Foreign Application Priority Data

Aug. 30, 2021 (JP) ................................ 2021-139787

(51) Int. Cl.
*H01Q 7/06* (2006.01)
*H01Q 1/24* (2006.01)
*H01Q 1/38* (2006.01)

(52) U.S. Cl.
CPC ................ *H01Q 7/06* (2013.01); *H01Q 1/24* (2013.01); *H01Q 1/38* (2013.01)

(58) Field of Classification Search
USPC ........................................................ 343/788
See application file for complete search history.

(56) References Cited

U.S. PATENT DOCUMENTS

2005/0151690 A1* 7/2005 Minemura ............... H01Q 7/00 343/866
2014/0125538 A1* 5/2014 Kanj ................. G06K 19/0779 343/866
2019/0181544 A1* 6/2019 Kim ........................ H01Q 1/38

FOREIGN PATENT DOCUMENTS

JP 2006-113944 A 4/2006
JP 2014-158132 A 8/2014
JP 2018-148452 A 9/2018
(Continued)

OTHER PUBLICATIONS

International Search Report issued in PCT/JP2022/032332; mailed Oct. 25, 2022.

*Primary Examiner* — Alexander H Taningco
*Assistant Examiner* — Brandon Sean Woods
(74) *Attorney, Agent, or Firm* — Studebaker Brackett PLLC

(57) ABSTRACT

A ring-type device includes a wireless power receiver circuit, a radio communication circuit, and a ring-shaped structure. The wireless power receiver circuit includes a power receiver circuit, and a loop coil. The radio communication circuit operates with the loop coil serving as an antenna. The power receiver circuit and the radio communication circuit include an electronic component, and a flexible circuit board to which the electronic component is mounted. The ring-shaped structure has a lateral ring face, a top ring face, and a bottom ring face. The loop coil is disposed along the top ring face. The flexible circuit board is planar in structure in its developed condition, and is disposed in a curved configuration along the lateral ring face of the ring-shaped structure.

15 Claims, 11 Drawing Sheets

(56) References Cited

FOREIGN PATENT DOCUMENTS

| | | | |
|---|---|---|---|
| JP | 2020-184764 | A | 11/2020 |
| WO | 2013/188977 | A2 | 12/2013 |
| WO | 2016/098527 | A1 | 6/2016 |
| WO | 2016/132654 | A1 | 8/2016 |
| WO | 2021/161565 | A1 | 8/2021 |

* cited by examiner

RING-TYPE DEVICE

CROSS-REFERENCE TO RELATED APPLICATIONS

This application claims benefit of priority to International Patent Application No. PCT/JP2022/032332, filed Aug. 29, 2022, and to Japanese Patent Application No. 2021-139787, filed Aug. 30, 2021, the entire contents of each are incorporated herein by reference.

BACKGROUND

Technical Field

The present disclosure relates to a ring-type device for radio communication and wireless power reception.

Background Art

Recent years have seen development of various ring-type radio communication devices that can be worn on a finger. Some of these devices are equipped with an antenna coil to provide capabilities such as near-field communication and wireless power reception.

For example, Japanese Unexamined Patent Application Publication No. 2020-184764 discloses a ring-type radio communication device with a near-field communication (NFC) antenna surrounded by an electrically conductive band. Japanese Unexamined Patent Application Publication No. 2018-148452 discloses a ring-shaped antenna device with a power feed coil disposed along the lateral face of a ring-shaped structure.

SUMMARY

Ring-type radio communication devices are worn on a finger for use. Such a device and its antenna coil are thus desired to be compact. Making the antenna coil compact, however, leads to deterioration of characteristics such as near-field communication capability and wireless power reception capability.

For both of the configurations mentioned above, that is, the configuration in which the antenna coil is disposed at a portion of the lateral face of the ring-shaped structure, and the configuration in which the antenna coil is wrapped around the circumference of the ring-shaped structure, the coil takes up much of the space inside the ring-shaped structure. This means that making the ring thinner results in smaller antenna coil size, leading to deterioration of radio communication characteristics and wireless power reception characteristics. For this reason, it is practically difficult in any case to make the ring thinner.

Further, if an electronic-component-mounting circuit including a power receiver circuit, a communication circuit, and other components, and the antenna coil differ in their construction or material, a connector or other means of connection needs to be provided at the location of electrical connection between the electronic-component-mounting circuit and the antenna coil. The presence of a connector or other means of connection, however, creates a bottleneck in reducing the size or thickness of the device. Moreover, the location of electrical connection is susceptible to breakage or failure, which may significantly compromise the reliability of the device.

Accordingly, the present disclosure provides a compact ring-type device that is superior in terms of radio communication performance and wireless power reception performance, and that has improved reliability.

A ring-type device according to an example of the present disclosure includes a wireless power receiver circuit; a radio communication circuit; and a ring-shaped structure. The wireless power receiver circuit includes a power receiver circuit, and a loop coil. The radio communication circuit operates with the loop coil serving as an antenna. The power receiver circuit and the radio communication circuit include an electronic component, and a flexible circuit board to which the electronic component is mounted. The ring-shaped structure has a lateral ring face, a top ring face, and a bottom ring face. The loop coil is disposed along the top ring face. The flexible circuit board is planar in structure in its developed condition, and is disposed in a curved configuration along the lateral ring face of the ring-shaped structure. A current flow through the loop coil causes magnetic flux to be generated in a direction perpendicular to the top ring face and to the bottom ring face.

A ring-type device according to an example of the present disclosure includes a wireless power receiver circuit; a radio communication circuit; and a ring-shaped structure. The wireless power receiver circuit includes a power receiver circuit, and a loop coil. The radio communication circuit operates with the loop coil serving as an antenna. The power receiver circuit and the radio communication circuit include an electronic component, and a flexible circuit board to which the electronic component is mounted. The ring-shaped structure has a lateral ring face, a top ring face, and a bottom ring face. The loop coil is disposed along the lateral ring face. The flexible circuit board is planar in structure in its developed condition, and is disposed in a curved configuration along the lateral ring face. The loop coil facing an external power transmitter coil defines an outline when projected onto a plane passing through a center of gravity of the ring-shaped structure, the outline having a length along the top ring face or the bottom ring face that is greater than or equal to a ring height and less than or equal to $\sqrt{3}$ times a radius of the ring-shaped structure, the ring height being a height between the top ring face and the bottom ring face. A current flow through the loop coil causes magnetic flux to be generated in a direction perpendicular to the lateral ring face.

A ring-type device according to an example of the present disclosure includes a wireless power receiver circuit; a radio communication circuit; and a ring-shaped structure. The wireless power receiver circuit includes a power receiver circuit, and a loop coil. The radio communication circuit operates with a communication loop coil serving as an antenna. The power receiver circuit and the radio communication circuit include an electronic component, and a flexible circuit board to which the electronic component is mounted. The ring-shaped structure has a lateral ring face, a top ring face, and a bottom ring face. The loop coil is disposed at the top ring face. The communication loop coil is disposed at the bottom ring face. The flexible circuit board is planar in structure in its developed condition, and is disposed in a curved configuration along the lateral ring face of the ring-shaped structure. A current flow through the loop coil causes magnetic flux to be generated in a direction perpendicular to the top ring face and to the bottom ring face. A current flow through the communication loop coil causes magnetic flux to be generated in the direction perpendicular to the top ring face and to the bottom ring face.

A ring-type device according to an example of the present disclosure includes a wireless power receiver circuit; a radio communication circuit; and a ring-shaped structure. The wireless power receiver circuit includes a power receiver circuit, and a first loop coil. The radio communication circuit operates with a second loop coil serving as an antenna. The power receiver circuit and the radio communication circuit include an electronic component, and a flexible circuit board to which the electronic component is mounted. The ring-shaped structure has a lateral ring face, a top ring face, and a bottom ring face. The first loop coil is disposed along the lateral ring face. The second loop coil is disposed at the top ring face. The flexible circuit board is planar in structure in its developed condition, and is disposed in a curved configuration along the lateral ring face. The first loop coil facing an external power transmitter coil defines an outline when projected onto a plane passing through a center of gravity of the ring-shaped structure, the outline having a length along the top ring face or the bottom ring face that is greater than or equal to a ring height and less than or equal to √3 times a radius of the ring-shaped structure, the ring height being a height between the top ring face and the bottom ring face. A current flow through the first loop coil causes magnetic flux to be generated in a direction perpendicular to the lateral ring face. A current flow through the second loop coil causes magnetic flux to be generated in a direction perpendicular to the top ring face and to the bottom ring face.

The present disclosure provides a compact ring-type device that is superior in terms of radio communication performance and wireless power reception performance, and that has improved reliability in terms of connection between an electronic-component mounting circuit and a loop coil while allowing for reduced thickness or size.

DETAILED DESCRIPTION

Embodiments for implementing the present disclosure are presented below with reference to the drawings by way of several specific examples. Throughout the drawings, the same reference signs are used to designate identical parts or features. Although separate embodiments are herein described for convenience in consideration of the ease of explanation or understanding of the main scope of the present disclosure, features described in different embodiments can be partially substituted for or combined with each other. In the second and subsequent embodiments, matters or features identical to those of the first embodiment are not be described, and only differences from the first embodiment are described. In particular, the same or similar operational effects provided by the same or similar features are not mentioned for each individual embodiment.

First Embodiment

Figure 1A:
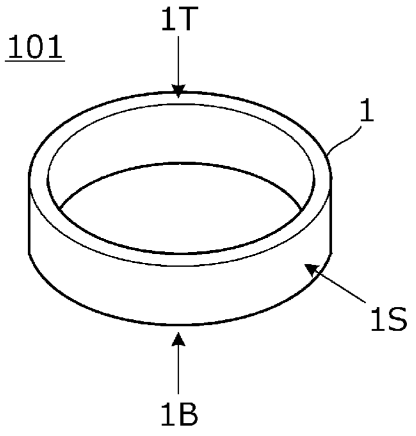
FIG. 1A is a perspective view of a ring-type device according to a first embodiment.
Figure 1B:
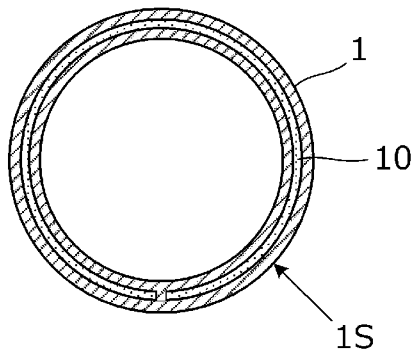
FIG. 1B is a cross-section of the ring-type device taken at a predetermined height position.

FIG. 1A is a perspective view of a ring-type device 101 according to a first embodiment. FIG. 1B is a cross-section of the ring-type device 101 taken at a predetermined height position.

The ring-type device 101 includes a ring-shaped structure 1. The ring-shaped structure 1 has a lateral ring face 1S, a top ring face 1T, and a bottom ring face 1B. As illustrated in FIG. 1B, the ring-shaped structure 1 is provided with a flexible circuit board 10 disposed in a curved configuration along the lateral ring face 1S.

Figure 2A:
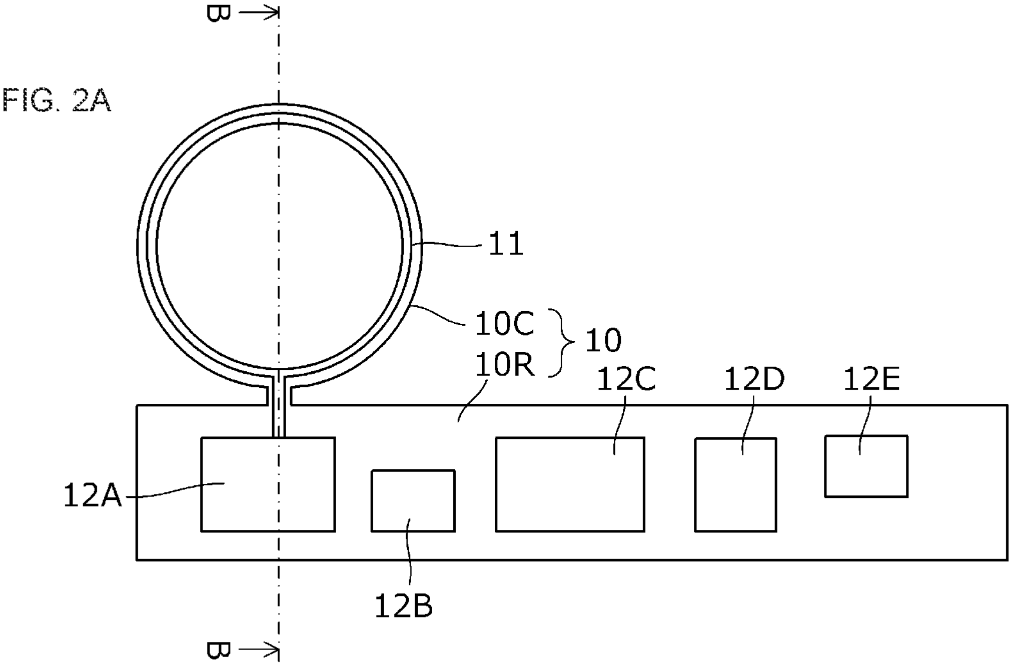
FIG. 2A is a plan view, in a developed condition, of a flexible circuit board disposed inside the ring-type device.
Figure 2B:
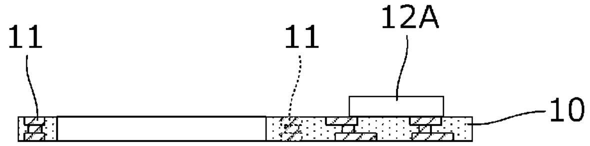
FIG. 2B is a cross-section taken along B-B in FIG. 2A.

FIG. 2A is a plan view, in a developed condition, of the flexible circuit board disposed inside the ring-type device 101. FIG. 2B is a cross-section taken along B-B in FIG. 2A. The flexible circuit board 10 includes a rectangular portion 10R, and an annular portion 10C. The annular portion 10C of the flexible circuit board 10 is provided with a loop coil 11. The rectangular portion 10R of the flexible circuit board 10 is provided with a power receiver circuit and a radio communication circuit. Multiple electronic components 12A, 12B, 12C, 12D, and 12E are mounted to the rectangular portion 10R of the flexible circuit board 10. The power receiver circuit and the radio communication circuit include the electronic components 12A to 12E, and the flexible circuit board 10. The power receiver circuit and the radio communication circuit are thus disposed along the circumferential surface of the ring-shaped structure 1.

With the flexible circuit board 10 disposed in the ring-shaped structure 1, a current flow through the loop coil 11 causes magnetic flux to be generated in a direction perpendicular to the top ring face 1T and to the bottom ring face 1B.

Figure 3:
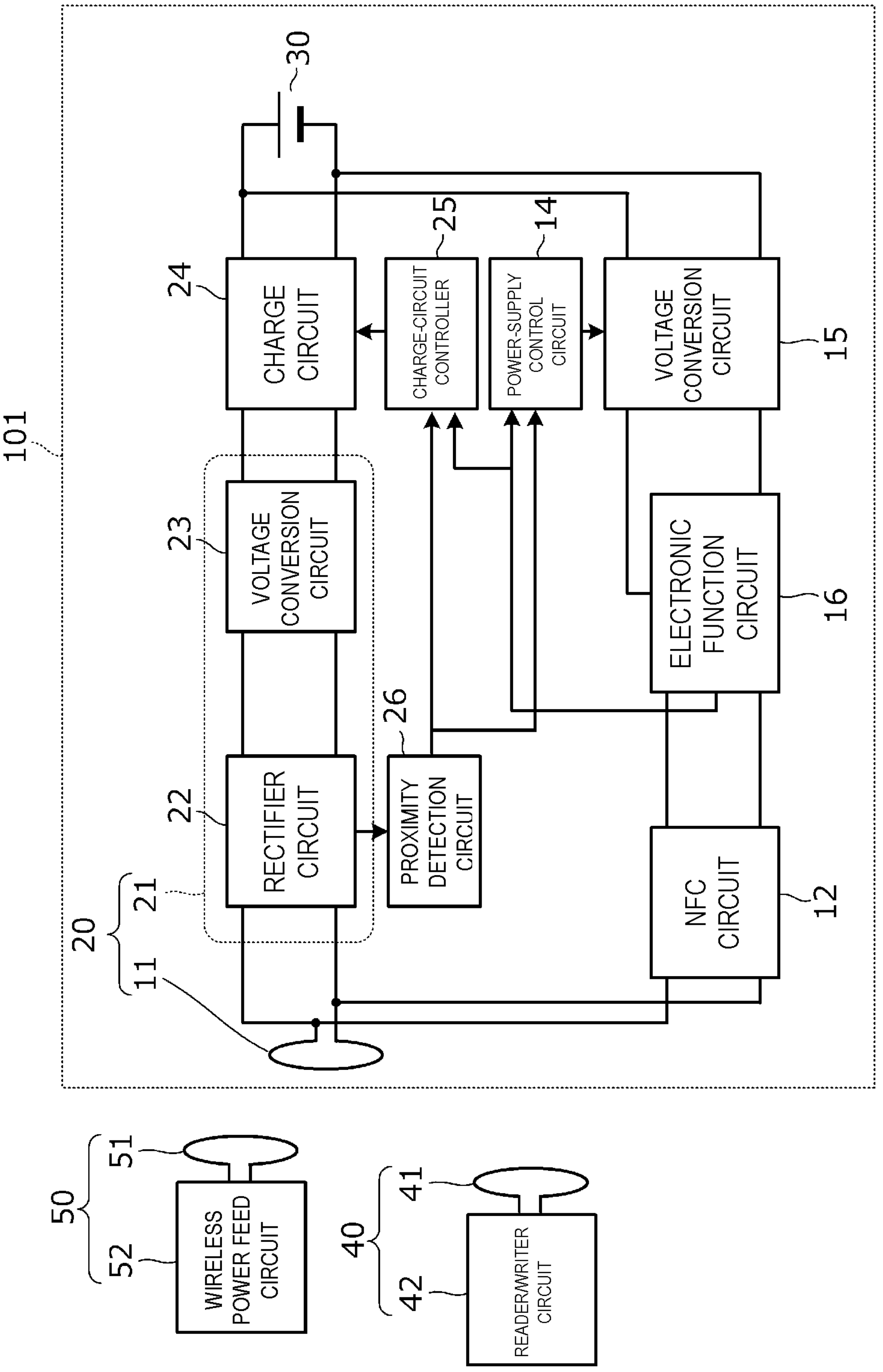
FIG. 3 is a block diagram illustrating the ring-type device, and a reader/writer and a wireless power feed device that are used in conjunction with the ring-type device.

FIG. 3 is a block diagram illustrating the ring-type device 101, and a reader/writer 40 and a wireless power feed device 50 that are used in conjunction with the ring-type device 101. The ring-type device 101 is capable of receiving power wirelessly from the wireless power feed device 50, and also capable of contactless communication with the reader/writer 40. The wireless power feed device 50 includes a wireless power transmitter coil 51, and a wireless power feed circuit 52. The reader/writer 40 includes a reader/writer antenna 41, and a reader/writer circuit 42.

The ring-type device 101 includes the loop coil 11, a rectifier circuit 22, a voltage conversion circuit 23, a charge circuit 24, and an electric storage device 30. The rectifier circuit 22 and the voltage conversion circuit 23 constitute a power receiver circuit 21. The loop coil 11 and the power receiver circuit 21 constitute a wireless power receiver circuit 20.

The ring-type device 101 includes an NFC circuit 12, an electronic function circuit 16, and a voltage conversion circuit 15. The ring-type device 101 further includes a proximity detection circuit 26, a charge-circuit controller 25, and a power-supply control circuit 14.

The proximity detection circuit 26 detects the proximity condition of the ring-type device 101 with respect to the wireless power feed device 50 based on a voltage output from the rectifier circuit 22. The proximity detection circuit 26 outputs a detection signal to the charge-circuit controller 25 and the power-supply control circuit 14.

The charge-circuit controller 25 controls the charge circuit 24. This control is performed either after the elapse of a predetermined time from detection of the "proximity condition" by the proximity detection circuit 26, or based on a notification signal provided from the electronic function circuit 16.

The power-supply control circuit 14 controls, based on the detection result provided from the proximity detection circuit 26, supply of power from the electric storage device 30 to the electronic function circuit 16. That is, based on a detection signal indicative of the "proximity condition" provided from the proximity detection circuit 26, the power-supply control circuit 14 enables execution of a power conversion operation by the voltage conversion circuit 15. This allows the electronic function circuit 16 to execute a predetermined operation.

The voltage conversion circuit 15 converts a voltage from the electric storage device 30 into a predetermined voltage, and supplies the resulting voltage to the electronic function circuit 16 as a power supply voltage.

Figure 4:
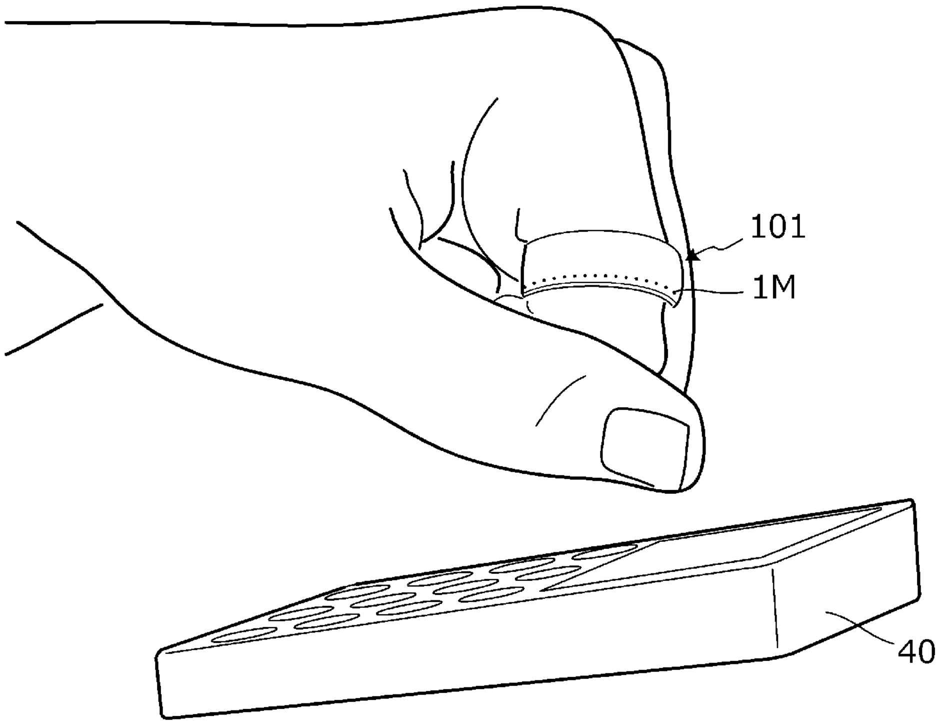
FIG. 4 illustrates an example of use of the ring-type device with respect to the reader/writer.

FIG. 4 illustrates an example of use of the ring-type device 101 with respect to the reader/writer 40. With the ring-type device 101 worn on a finger of a user, the ring-type device 101 is placed in proximity to the reader/writer 40, such that the loop coil 11 of the ring-type device 101, and the reader/writer 40 face each other in substantially parallel relation. Further, at this time, the loop coil 11 and the reader/writer antenna 41 are effectively spaced in proximity to each other. In this state, the reader/writer antenna 41 of the reader/writer 40, and the loop coil 11, which are illustrated in FIG. 3, magnetically couple to each other. The NFC circuit 12 thus communicates wirelessly with the reader/writer circuit 42.

If the loop coil 11 is to be positioned near the top ring face 1T illustrated in FIG. 1A, an indicator (mark) 1M illustrated in FIG. 4 indicates where the top ring face 1T is located. The user uses the ring-type device 101 with the indicator 1M facing the reader/writer 40. As the top ring face 1T is thus positioned to face the reader/writer 40, the spacing between the loop coil 11 and the reader/writer 40 further decreases.

If the loop coil 11 and the reader/writer 40 are not to be placed too close to each other during use, the indicator (mark) 1M illustrated in FIG. 4 may indicate where the bottom ring face 1B is located, and the user may use the ring-type device 101 with the indicator 1M facing the reader/writer 40.

Figure 5:
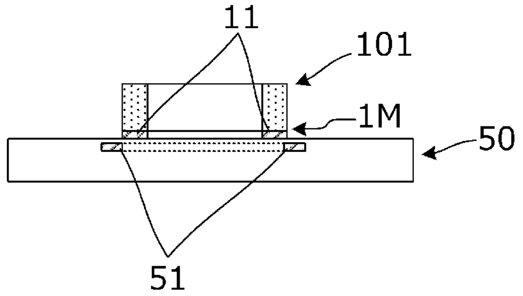
FIG. 5 is a cross-section of a major portion, illustrating an example of use of the ring-type device with respect to the wireless power feed device.

FIG. 5 is a cross-section of a major portion, illustrating an example of use of the ring-type device 101 with respect to the wireless power feed device 50. In this example, the ring-type device 101 alone is placed on the wireless power feed device 50. In this state, the loop coil 11 of the ring-type device 101, and the wireless power transmitter coil 51 of the wireless power feed device 50 face each other in substantially parallel relation. Further, at this time, the loop coil 11 and the wireless power transmitter coil 51 are positioned in proximity to each other at their closest distance. In this state, the wireless power transmitter coil 51 of the wireless power feed device 50, and the loop coil 11, which are illustrated in FIG. 3, magnetically couple to each other. The power receiver circuit 21 thus receives power wirelessly from the wireless power feed circuit 52.

In the example illustrated in FIG. 5, the ring-type device 101 is placed on the wireless power feed device 50 such that the top ring face (the top ring face 1T illustrated in FIG. 1A), at which the loop coil 11 is located, is in contact with the top face of the wireless power feed device 50 (such that the indicator (mark) 1M indicating the location of the loop coil 11 is in contact with the top face of the wireless power feed device 50). The loop coil 11 and the wireless power transmitter coil 51 are thus positioned in proximity to each other at their closest distance. If the loop coil 11 and the wireless power transmitter coil 51 are not to be placed too close to each other during use, the ring-type device 101 may be placed on the wireless power feed device 50 such that the bottom ring face (the bottom ring face 1B illustrated in FIG. 1A) is in contact with the top face of the wireless power feed device 50.

Figure 6:
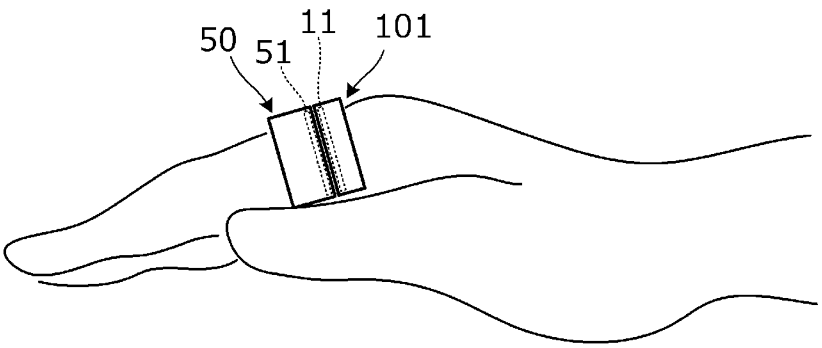
FIG. 6 illustrates another example of use of the ring-type device with respect to the wireless power feed device.

FIG. 6 illustrates another example of use of the ring-type device 101 with respect to the wireless power feed device 50. In this example, the wireless power feed device 50 is in ring form, and worn on a finger of a user. In the example illustrated in FIG. 6, the wireless power feed device 50 and the ring-type device 101 are both worn on the same (single) finger. In this state, the loop coil 11 of the ring-type device 101, and the wireless power transmitter coil 51 of the wireless power feed device 50 face each other in substantially parallel relation. Further, at this time, the loop coil 11 and the wireless power transmitter coil 51 are positioned in proximity to each other at their closest distance. In this state, the wireless power transmitter coil 51 of the wireless power feed device 50, and the loop coil 11, which are illustrated in FIG. 3, magnetically couple to each other. The power receiver circuit 21 thus receives power wirelessly from the wireless power feed circuit 52.

In the example illustrated in FIG. 6, the ring-type device 101 and the wireless power feed device 50 are worn on a finger such that the loop coil 11 of the ring-type device 101, and the wireless power transmitter coil 51 of the wireless power feed device 50 are at their closest distance to each other. If, however, the loop coil 11 and the wireless power transmitter coil 51 are not to be placed too close to each other during use, the ring-type device 101 may be worn with the bottom ring face (the bottom ring face 1B illustrated in FIG. 1A) being positioned near the base of the finger.

Second Embodiment

A second embodiment is directed to an example of a ring-type device with the loop coil disposed along the lateral ring face.

Figure 7A:
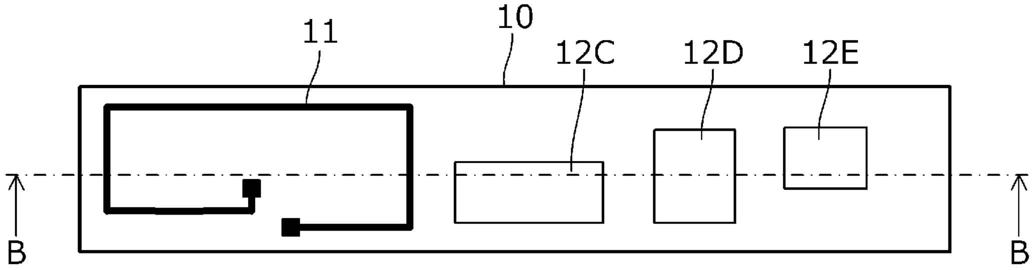
FIG. 7A is a plan view, in a developed condition, of the flexible circuit board disposed inside a ring-type device according to a second embodiment.
Figure 7B:
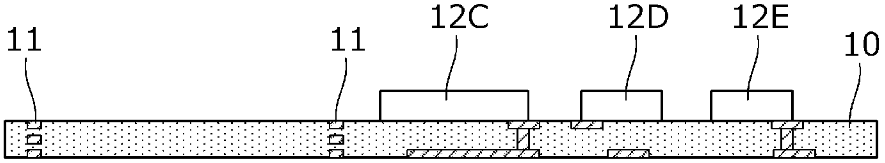
FIG. 7B is a cross-section taken along B-B in FIG. 7A.
Figure 8A:
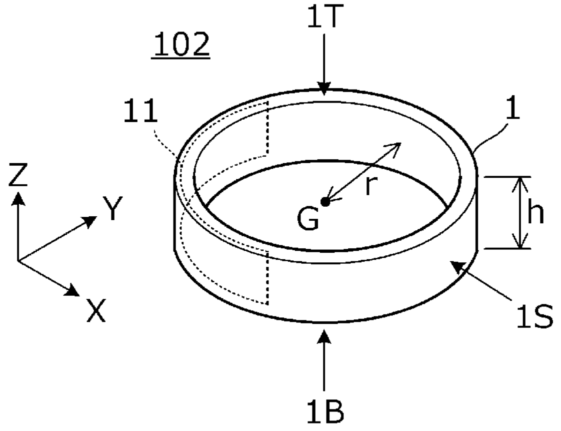
FIG. 8A is a perspective view of a ring-type device.
Figure 8B:
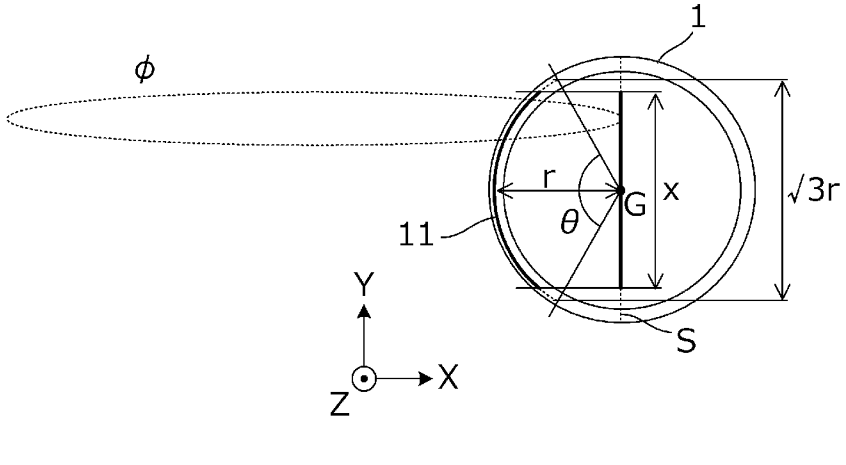
FIG. 8B illustrates a region of the ring-type device where a loop coil is located.

FIG. 7A is a plan view, in a developed condition, of the flexible circuit board disposed inside a ring-type device according to the second embodiment. FIG. 7B is a cross-section taken along B-B in FIG. 7A. FIG. 8A is a perspective view of a ring-type device 102 according to the second embodiment. FIG. 8B illustrates a region of the ring-type device 102 where the loop coil is located.

As with the example according to the first embodiment, the ring-type device 102 includes the ring-shaped structure having the lateral ring face 1S, the top ring face 1T, and the bottom ring face 1B. The ring-shaped structure is provided with the flexible circuit board 10 disposed along the lateral ring face. The flexible circuit board 10 is provided with the loop coil 11 having a rectangular helical shape.

Due to the above-mentioned construction, a current flow through the loop coil 11 causes magnetic flux to be generated in a direction perpendicular to the lateral ring face 1S.

The loop coil 11 of the ring-type device according to the second embodiment magnetically couples to the wireless power transmitter coil 51 of the wireless power feed device 50 illustrated in FIG. 3. The loop coil 11 also magnetically couples to the reader/writer antenna 41 of the reader/writer 40 illustrated in FIG. 3.

The ring-type device according to the second embodiment is designed for magnetic coupling through magnetic flux running perpendicular to the lateral ring face of the ring-shaped structure. Accordingly, the ring-type device 102 is positioned with the lateral ring face facing the wireless power transmitter coil 51 or the reader/writer antenna 41.

As illustrated in FIG. 8A and FIG. 8B, the ring-shaped structure 1 has the lateral ring face 1S, the top ring face 1T, and the bottom ring face 1B, with the loop coil 11 disposed along the lateral ring face 1S.

In FIG. 8B, magnetic flux $\varphi$ represents part of the magnetic flux that provides coupling between the loop coil 11, and an external wireless power transmitter coil or an external reader/writer antenna.

Now, the ring height between the top ring face 1T and the bottom ring face 1B is denoted h, and the radius of the ring-shaped structure 1 (the radius from the center of gravity G to the loop coil 11) is denoted r. In this case, when the loop coil 11 facing the wireless power transmitter coil or the reader/writer antenna is projected onto a plane S passing through the center of gravity G of the ring-shaped structure 1, the loop coil 11 has an outline with a length x along the top ring face 1T or the bottom ring face 1B. The length x is given as below.

$$h \le x \le \sqrt{3}r$$

Accordingly, the angle $\theta$ when $x=\sqrt{3}r$ as illustrated in FIG. 8B is 120 degrees.

Figure 9:
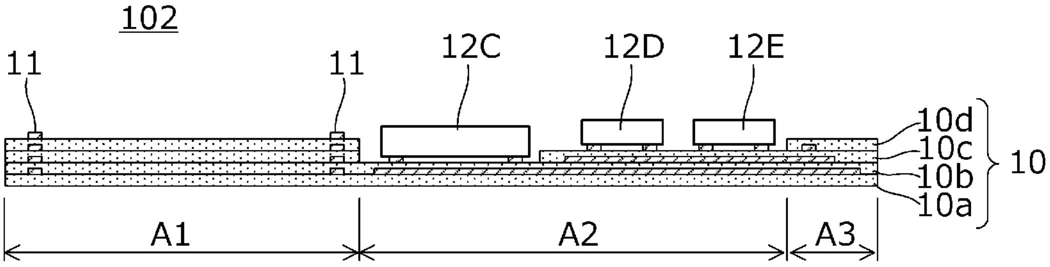
FIG. 9 is a cross-section of the ring-type device according to the second embodiment.

FIG. 9 is a cross-section of the ring-type device 102 according to the second embodiment. The flexible circuit board 10 is a multilayer body including resin layers 10*a*, 10*b*, 10*c*, and 10*d*, and conductor layers. The conductor layers define features such as connection electrodes for the electronic components 12C, 12D, and 12E, the loop coil 11, and wiring. The multilayer body has a first region A1, second region A2, and another region A3. The first region A1 includes the loop coil 11. The second region A2 is a region to which the electronic components 12C, 12D, and 12E are mounted. In the first region A1, the number of stacked layers including the resin layers and the conductor layers is greater than the number of stacked layers in the second region A2. The configuration mentioned above makes it possible to increase the number of turns of the loop coil 11, and reduce the thickness of the mount part to which the electronic components 12C, 12D, and 12E are mounted. That is, the configuration mentioned above makes it possible to provide the ring-type device 102 that is generally thin but includes a loop coil with an increased number of turns.

Figure 16A:
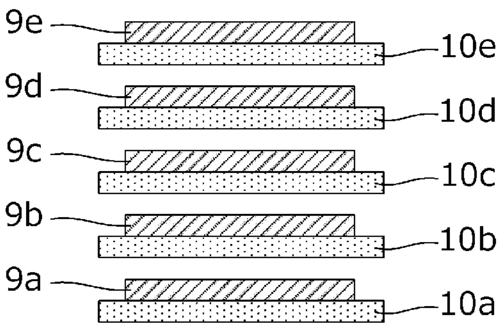
FIG. 16A and FIG. 16B each illustrate, in exploded cross-section, the structure of the flexible circuit board.
Figure 16B:
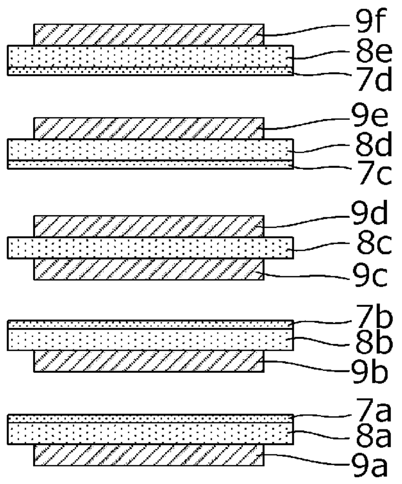

Reference is now made to the construction and electrical characteristics of the flexible circuit board according to the second embodiment. FIG. 16A and FIG. 16B each illustrate, in exploded cross-section, the structure of the flexible circuit board. The flexible circuit board illustrated in FIG. 16A is produced as follows. First, resin layers 10*a*, 10*b*, 10*c*, 10*d*, and 10*e* made of a material such as liquid crystal polymer, and copper foils 9*a*, 9*b*, 9*c*, 9*d*, and 9*e* are respectively bonded together into sheet form. In this state, each copper foil is patterned into a predetermined pattern, and all of the resulting sheets are stacked and then subjected to pressure and heat to thereby produce the flexible circuit board. The flexible circuit board illustrated in FIG. 16B is produced through a procedure described below. (1) The following resin layers made of a material such as polyimide, and the following copper coils are bonded together into sheet form: a resin layer 8*a* and the copper foil 9*a*; a resin layer 8*b* and the copper foil 9*b*; a resin layer 8*c* and the copper foils 9*c* and 9*d*; a resin layer 8*d* and the copper foil 9*e*; and a resin layer 8*e* and a copper foil 9*f*. Each copper foil is then patterned into a predetermined pattern. (2) Adhesion layers 7*a*, 7*b*, 7*c*, and 7*d* are formed on the resulting sheets. (3) The sheet including the resin layer 8*b* and the copper foil 9*b*, and the sheet including the resin layer 8*d* and the copper foil 9*e* are each stacked, by means of an adhesion layer, onto a core substrate, which in this case is the sheet including the resin layer 8*c* and the copper foils 9*c* and 9*d*. The resulting structure is then subjected to pressure and heat to thereby produce a multilayer body corresponding to a core portion. (4) The sheet including the resin layer 8*a* and the copper foil 9*a*, and the sheet including the resin layer 8*e* and the copper foil 9*f* are each stacked, by means of an adhesion layer, onto the multilayer body corresponding to the core portion, and the resulting structure is then subjected to pressure and heat. Through the procedure mentioned above, the flexible circuit board is produced.

The flexible circuit board illustrated in FIG. 16A has characteristic features described below. That is, production of the flexible circuit board involves preparing a required number of layers of sheets each made of a resin and a copper foil that are bonded together, and pressing and integrating the layers of sheets together all at once. At this time, no adhesion layer is required to attach the sheets together. Further, with the flexible circuit board, the relative permittivity ($\varepsilon r$), the glass-epoxy dielectric loss tangent ($\tan\delta$), and the coefficient of water absorption are low relative to those of resin materials used for resin substrates according to the related art (such as a glass-epoxy substrate or a flexible circuit board made of polyimide).

Figure 17A:
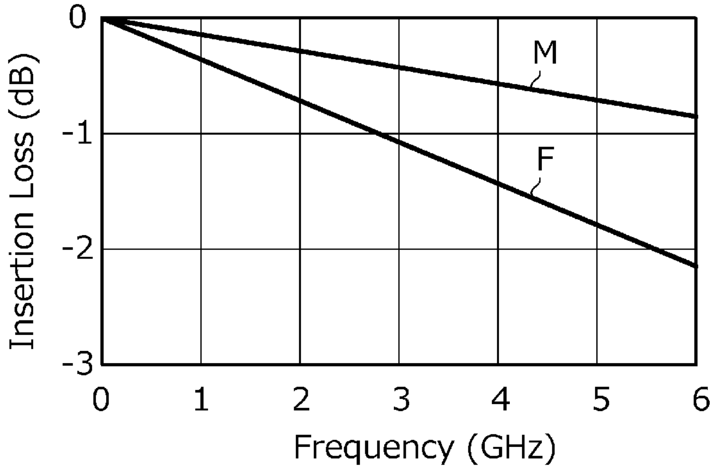
FIG. 17A and FIG. 17B illustrate the electrical characteristics of flexible circuit boards.
Figure 17B:
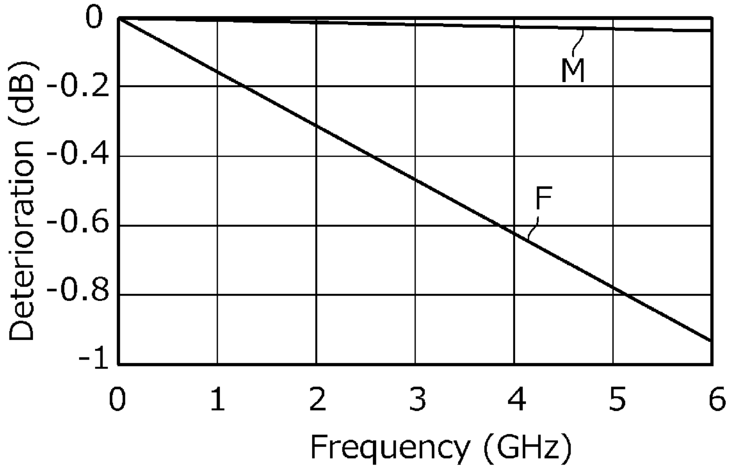

FIG. 17A and FIG. 17B illustrate the electrical characteristics of flexible circuit boards. FIG. 17A illustrates the frequency characteristics of insertion loss of a transmission line provided in each flexible circuit board. In FIG. 17A, a characteristic line M represents the frequency characteristics of insertion loss of a transmission line provided in the flexible circuit board constructed as illustrated in FIG. 16A, and a characteristic line F represents the frequency characteristics of insertion loss of a transmission line provided in the flexible circuit board constructed as illustrated in FIG. 16B.

As can be appreciated, the flexible circuit board illustrated in FIG. 16A has low insertion loss at higher frequencies, and thus allows for reduced insertion loss for higher frequency signals.

FIG. 17B illustrates deterioration of the frequency characteristics of insertion loss, due to high temperature and high humidity condition, of a transmission line provided in each flexible circuit board. In FIG. 17B, the characteristic line M represents the characteristics of the transmission line provided in the flexible circuit board constructed as illustrated in FIG. 16A, and the characteristic line F represents the characteristics of the transmission line provided in the flexible circuit board constructed as illustrated in FIG. 16B.

As can be appreciated, the flexible circuit board illustrated in FIG. 16A is made of a resin material with low water absorption and low moisture absorption coefficient, and no adhesion layer is required to attach individual layers together. This makes it possible to achieve a highly reliable product with superior water resistance and superior perspiration resistance.

Third Embodiment

A third embodiment is directed to an example of a ring-type device including a magnetic sheet positioned along the loop coil.

Figure 10:
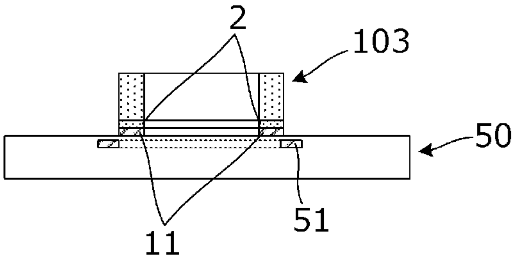
FIG. 10 is a cross-section of a major portion, illustrating an example of use of a ring-type device according to a third embodiment with respect to the wireless power feed device.

FIG. 10 is a cross-section of a major portion, illustrating an example of use of a ring-type device 103 according to the third embodiment with respect to the wireless power feed device 50. In this example, a circular magnetic sheet 2 is disposed along the loop coil 11. This construction allows a predetermined inductance to be obtained even if the loop coil 11 has a small number of turns. This construction also allows for increased coefficient of magnetic coupling between the loop coil 11 and the wireless power transmitter coil 51.

In the example illustrated in FIG. 10, the loop coil 11 is disposed between the magnetic sheet 2 and the wireless power transmitter coil 51. In an alternative example, the magnetic sheet 2 may be positioned such that the magnetic sheet 2 is disposed between the loop coil 11 and the wireless power transmitter coil 51.

In the example illustrated in FIG. 10, the loop coil 11 is disposed at a face that faces the top face of the wireless power feed device 50. In an alternative example, if the loop coil 11 is to be positioned along the lateral ring face 1S as illustrated in FIGS. 7A and 7B, the magnetic sheet may be disposed along the loop coil 11 positioned as described above.

Fourth Embodiment

A fourth embodiment is directed to an example of a ring-type device including a first loop coil and a second loop coil.

Figure 11:
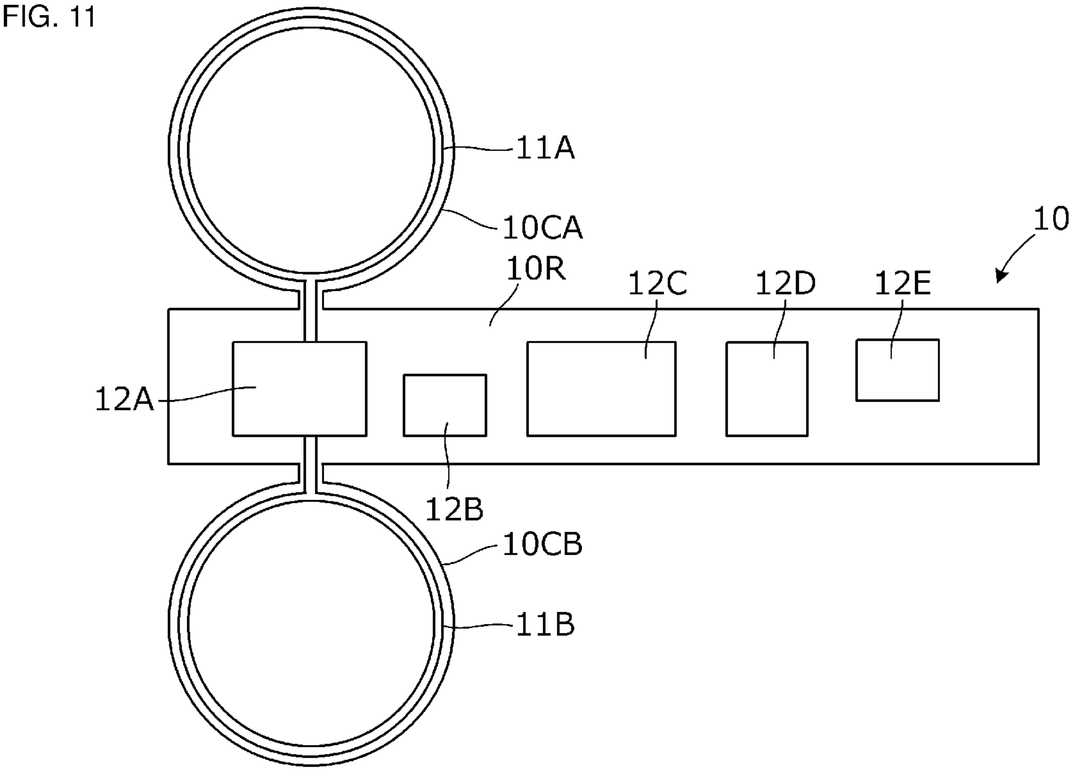
FIG. 11 is a plan view, in a developed condition, of the flexible circuit board disposed inside a ring-type device according to a fourth embodiment.

FIG. 11 is a plan view, in a developed condition, of the flexible circuit board disposed inside a ring-type device according to a fourth embodiment. The flexible circuit board 10 includes the rectangular portion 10R, and two annular portions 10CA and 10CB. The annular portion 10CA of the flexible circuit board 10 is provided with a first loop coil 11A, and the annular portion 10CB is provided with a second loop coil 11B. The rectangular portion 10R of the flexible circuit board 10 is provided with the power receiver circuit and the radio communication circuit. Multiple electronic components 12A, 12B, 12C, 12D, and 12E are mounted to the rectangular portion 10R of the flexible circuit board 10. The power receiver circuit and the radio communication circuit include the electronic components 12A to 12E, and the flexible circuit board 10.

The configuration of the ring-shaped structure is the same as that according to the first embodiment illustrated in FIG. 1A. The power receiver circuit and the radio communication circuit are thus disposed along the circumferential surface of the ring-shaped structure.

With the flexible circuit board 10 disposed in the ring-shaped structure, a current flow through the first loop coil 11A causes magnetic flux to be generated in a direction perpendicular to the top ring face 1T and to the bottom ring face 1B. Likewise, a current flow through the second loop coil 11B causes magnetic flux to be generated in the direction perpendicular to the top ring face 1T and to the bottom ring face 1B.

Figure 12:
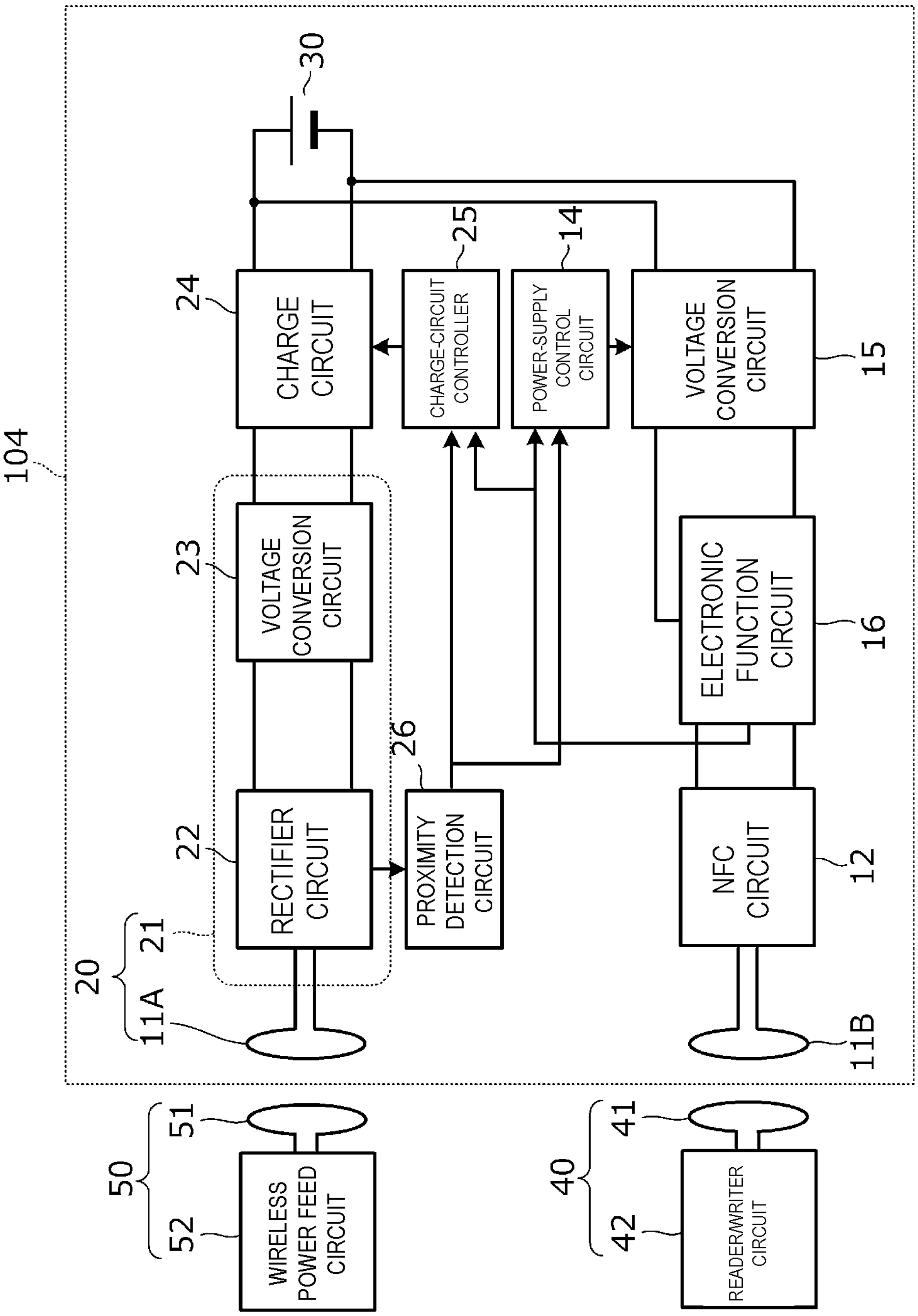
FIG. 12 is a block diagram illustrating a ring-type device according to the fourth embodiment, and the reader/writer and the wireless power feed device that are used in conjunction with the ring-type device.

FIG. 12 is a block diagram illustrating a ring-type device 104 according to the fourth embodiment, and the reader/writer 40 and the wireless power feed device 50 that are used in conjunction with the ring-type device 104. The ring-type device 104 is capable of receiving power wirelessly from the wireless power feed device 50, and also capable of contactless communication with the reader/writer 40. The wireless power feed device 50 includes the wireless power transmitter coil 51, and the wireless power feed circuit 52. The reader/writer 40 includes the reader/writer antenna 41, and the reader/writer circuit 42.

The ring-type device 104 includes the first loop coil 11A, the second loop coil 11B, the rectifier circuit 22, the voltage conversion circuit 23, the charge circuit 24, and the electric storage device 30. The rectifier circuit 22 and the voltage conversion circuit 23 constitute the power receiver circuit 21. The first loop coil 11A and the power receiver circuit 21 constitute the wireless power receiver circuit 20.

The ring-type device 104 includes the NFC circuit 12, the electronic function circuit 16, and the voltage conversion circuit 15. The NFC circuit 12 operates with the second loop coil 11B serving as an antenna. The ring-type device 104 is otherwise similar in configuration to the ring-type device 101 according to the first embodiment illustrated in FIG. 3.

As described above with reference to the fourth embodiment, a loop coil for wireless power reception, and a loop coil for radio communication may be provided independently. Further, the loop coil may be provided by using both the top ring face and the bottom ring face of the ring-shaped structure.

Fifth Embodiment

A fifth embodiment is directed to an example of a ring-type device including the first loop coil and the second loop coil that differ in their configuration.

Figure 13:
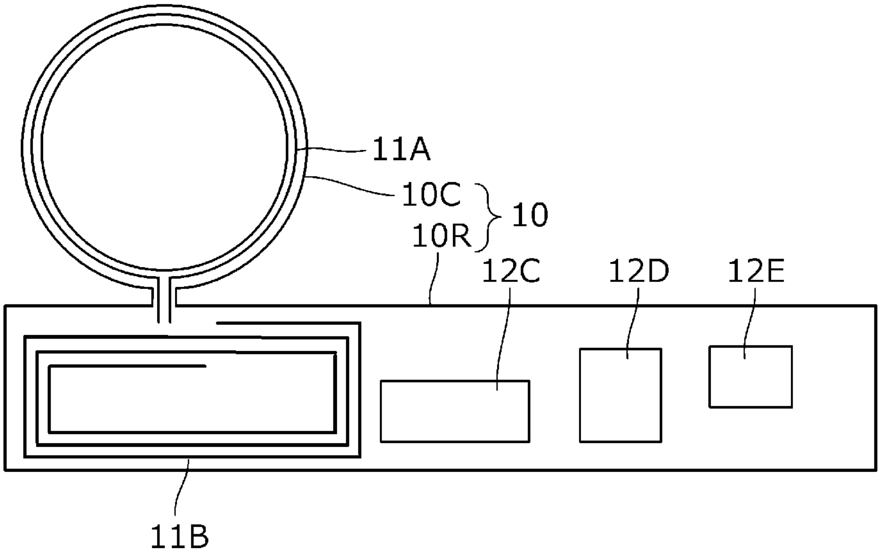
FIG. 13 is a plan view, in a developed condition, of the flexible circuit board disposed inside a ring-type device according to a fifth embodiment.

FIG. 13 is a plan view, in a developed condition, of the flexible circuit board disposed inside a ring-type device according to the fifth embodiment. As illustrated in FIG. 13, the flexible circuit board 10 includes the rectangular portion 10R, and the annular portion 10C. The annular portion 10C of the flexible circuit board 10 is provided with the first loop coil 11A. The rectangular portion 10R is provided with the second loop coil 11B that is in rectangular spiral form. The rectangular portion 10R of the flexible circuit board 10 is provided with the power receiver circuit and the radio communication circuit. Multiple electronic components 12C, 12D, and 12E are mounted to the rectangular portion 10R of the flexible circuit board 10. The power receiver circuit and the radio communication circuit include the electronic components 12C, 12D, and 12E, and the flexible circuit board 10. The power receiver circuit and the radio communication circuit are thus disposed along the circumferential surface of the ring-shaped structure 1.

The fifth embodiment is otherwise identical in configuration to, for example, the first and fourth embodiments. As described above, the first loop coil for wireless power reception may be disposed at the top ring face, and the second loop coil for radio communication may be disposed along the lateral ring face.

Likewise, the first loop coil for wireless power reception may be disposed along the lateral ring face, and the second loop coil for radio communication may be disposed at the top ring face.

Sixth Embodiment

A sixth embodiment is directed to an example of a ring-type device including the ring-shaped structure that is electrically conductive.

Figure 14A:
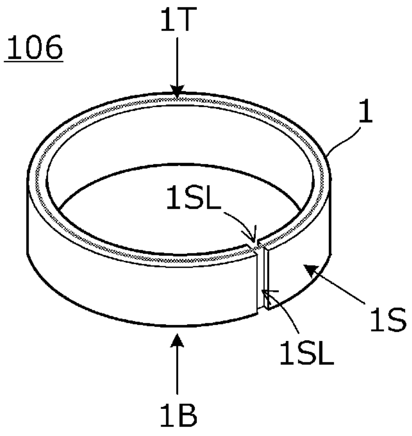
FIG. 14A is a perspective view of a ring-type device according to a sixth embodiment.
Figure 14B:
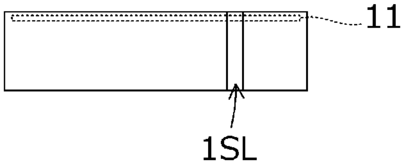
FIG. 14B is a front view of the ring-type device.

FIG. 14A is a perspective view of a ring-type device 106 according to a sixth embodiment, and FIG. 14B is a front view of the ring-type device 106. The ring-shaped structure 1 of the ring-type device 106 is made of a ring-shaped metal, except for a portion corresponding to the flexible circuit board. The ring-shaped metal has a slit 1SL defining a gap. Due to the presence of the slit 1SL, the ring-shaped metal defines an electrically open loop.

The loop coil 11, which is provided in the annular portion of the flexible circuit board, is disposed at the top ring face 1T.

According to the sixth embodiment, a current induced by the magnetic flux passing through the coil opening of the loop coil 11 does not circulate around the circumference of the ring-shaped metal. This makes it possible to avoid reduction of induced magnetic field.

Seventh Embodiment

A seventh embodiment is directed to an example of a ring-type device provided with the indicator indicating where the loop coil is located. The first embodiment illustrated in FIG. 4 mentioned above is directed to an example of the indicator (mark) 1M indicating where the loop coil is located. The seventh embodiment represents another example of such an indicator.

Figure 15A:
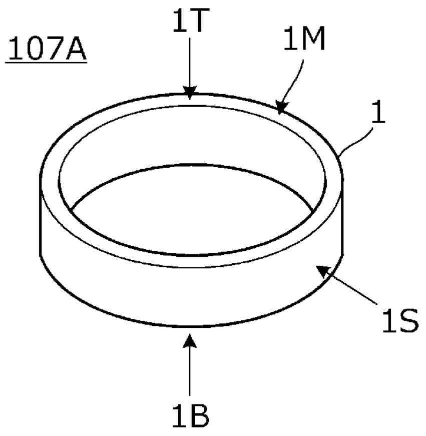
FIG. 15A is a perspective view of a ring-type device according to a seventh embodiment.

A ring-type device 107A illustrated in FIG. 15A includes the indicator 1M that uses color to indicate where the loop coil is located. That is, the loop coil is located near the top ring face 1T of the ring-shaped structure 1, and the top ring face 1T differs in color from the bottom ring face 1B or the lateral ring face 1S.

The indicator 1M allows easy visual identification of which face of the ring-type device the loop coil is located at. This allows the loop coil of the ring-type device 107A to be properly oriented toward a coil of a device from which to receive power or toward a coil of a device with which to communicate.

Figure 15B:
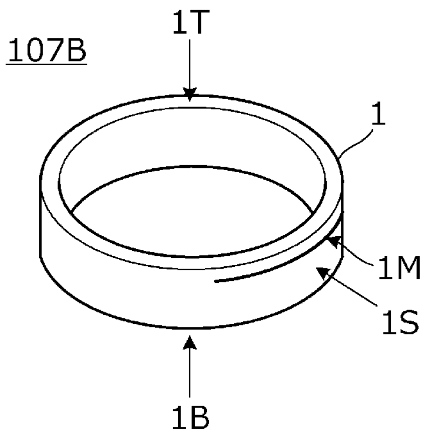
FIG. 15B is a perspective view of a ring-type device.

A ring-type device 107B illustrated in FIG. 15B includes the indicator (mark) 1M that uses color to indicate where the loop coil is located. That is, the ring-type device 107B includes the indicator (mark) 1M indicating a region of the lateral ring face 1S of the ring-shaped structure 1 where the loop coil is located.

As described above, the indicator 1M allows easy visual identification of which region of the ring-type device the loop coil is located at. This allows the loop coil of the ring-type device 107B to be properly oriented toward a coil of a device from which to receive power or toward a coil of a device with which to communicate.

Lastly, the present disclosure is not limited to the above-mentioned embodiments. Various modifications and variations can be made to the embodiments as appropriate by persons skilled in the art. The scope of the present disclosure is defined not by the above-mentioned embodiments but by the appended claims. Further, the scope of the present disclosure is intended to cover all modifications and variations that may fall within the scope of the appended claims and their equivalents.

What is claimed is:

1. A ring-type device comprising:

a wireless power receiver circuit comprising a power receiver circuit and a loop coil;

a radio communication circuit configured to operate with the loop coil serving as an antenna; and a ring-shaped structure having a lateral ring face, a top ring face and a bottom ring face, with the loop coil being along the top ring face, wherein the power receiver circuit and the radio communication circuit comprise an electronic component, and a flexible circuit board to which the electronic component is mounted, the flexible circuit board is planar in structure, and is in a curved configuration along the lateral ring face of the ring-shaped structure, and the loop coil is configured such that a current flow through the loop coil causes magnetic flux to be generated in a direction perpendicular to the top ring face and to the bottom ring face.

2. The ring-type device according to claim 1, wherein the loop coil is in the flexible circuit board, and as the flexible circuit board is bent, the loop coil is positioned along the top ring face.

3. The ring-type device according to claim 2, wherein the ring-shaped structure includes metal, and the lateral ring face has a slit defining a gap.

4. The ring-type device according to claim 2, wherein the flexible circuit board is a multilayer body comprising a plurality of stacked layers, the plurality of stacked layers comprising a resin layer and a conductor layer, the multilayer body comprising at least a first region and a second region, the first region including the loop coil, the second region being a region to which the electronic component is mounted, and in the first region, the resin layer and the conductor layer comprise a number of stacked layers greater than a number of stacked layers in the second region, and the first region and the second region are electrically connected to each other.

5. The ring-type device according to claim 2, further comprising:

a magnetic sheet extending along the loop coil, and wherein the loop coil is in sheet form.

6. The ring-type device according to claim 2, wherein the ring-shaped structure is sized to fit on a finger of a user, and comprises an indicator, the indicator indicating where the loop coil is located.

7. The ring-type device according to claim 1, wherein the loop coil extends along the top ring face and along the bottom ring face.

8. The ring-type device according to claim 7, wherein the loop coil is in the flexible circuit board, and as the flexible circuit board is bent, the loop coil is positioned along the top ring face and the bottom ring face.

9. The ring-type device according to claim 8, wherein the ring-shaped structure includes metal, and the lateral ring face has a slit defining a gap.

10. The ring-type device according to claim 7, wherein the flexible circuit board is a multilayer body comprising a plurality of stacked layers, the plurality of stacked layers comprising a resin layer and a conductor layer, the multilayer body comprising at least a first region and a second region, the first region including the loop coil, the second region being a region to which the electronic component is mounted, and in the first region, the resin layer and the conductor layer comprise a number of stacked layers greater than a number of stacked layers in the second region, and the first region and the second region are electrically connected to each other.

11. The ring-type device according to claim 1, wherein the flexible circuit board is a multilayer body comprising a plurality of stacked layers, the plurality of stacked layers comprising a resin layer and a conductor layer, the multilayer body comprising at least a first region and a second region, the first region including the loop coil, the second region being a region to which the electronic component is mounted, and in the first region, the resin layer and the conductor layer comprise a number of stacked layers greater than a number of stacked layers in the second region, and the first region and the second region are electrically connected to each other.

12. The ring-type device according to claim 1, further comprising:

a magnetic sheet extending along the loop coil, and wherein the loop coil is in sheet form.

13. The ring-type device according to claim 1, wherein the ring-shaped structure is sized to fit on a finger of a user, and comprises an indicator, the indicator indicating where the loop coil is located.

14. The ring-type device according to claim 1, wherein the loop coil extends in a plane of the flexible circuit board.

15. The ring-type device according to claim 1, wherein the flexible circuit board comprises an annular portion forming the loop coil, and the annular portion is positioned to follow the curved configuration of the lateral ring face of the ring-shaped structure.

* * * * *